US009690950B2

(12) United States Patent
Vergnes et al.

(10) Patent No.: US 9,690,950 B2
(45) Date of Patent: *Jun. 27, 2017

(54) METHOD FOR EXPORTING DATA OF A JAVACARD APPLICATION STORED IN A UICC TO A HOST

(75) Inventors: Fabrice Vergnes, Fuveau (FR); Franck Imoucha, Auriol (FR); Nicolas Roussel, Marseilles (FR)

(73) Assignee: GEMALTO SA, Meudon (FR)

( * ) Notice: Subject to any disclaimer, the term of this patent is extended or adjusted under 35 U.S.C. 154(b) by 168 days.

This patent is subject to a terminal disclaimer.

(21) Appl. No.: 13/992,103

(22) PCT Filed: Dec. 5, 2011

(86) PCT No.: PCT/EP2011/071695
§ 371 (c)(1),
(2), (4) Date: Nov. 14, 2013

(87) PCT Pub. No.: WO2012/076440
PCT Pub. Date: Jun. 14, 2012

(65) Prior Publication Data
US 2015/0038193 A1 Feb. 5, 2015

Related U.S. Application Data

(63) Continuation of application No. 13/312,309, filed on Dec. 6, 2011, now Pat. No. 9,301,145.

(30) Foreign Application Priority Data

Dec. 6, 2010 (EP) .................................... 10306359

(51) Int. Cl.
*G06F 21/62* (2013.01)
*H04W 8/24* (2009.01)
(Continued)

(52) U.S. Cl.
CPC ............ *G06F 21/6218* (2013.01); *G06F 8/61* (2013.01); *H04B 1/3816* (2013.01);
(Continued)

(58) Field of Classification Search
CPC ........ G06F 9/4856; G06F 9/4881; G06F 8/65; G07F 7/1008; G07F 7/0866;
(Continued)

(56) References Cited

U.S. PATENT DOCUMENTS 6,978,152 B1  12/2005  Yamaashi et al.
7,024,390 B1   4/2006  Mori et al.
(Continued)

FOREIGN PATENT DOCUMENTS

CN   101080051 A   11/2007
CN   101179401 A    5/2008
(Continued)

OTHER PUBLICATIONS

"3rd Generation Partnership Project; Technical Specification Group Services and System Aspects; Service aspects; Service principles (Release 11)", 3GPP TS 22.101 V11.0.0 (Sep. 2010), pp. 1-60.
(Continued)

*Primary Examiner* — Nizar Sivji
(74) *Attorney, Agent, or Firm* — Buchanan Ingersoll & Rooney PC

(57) ABSTRACT

The invention proposes a method for exporting data of a Javacard application stored in a UICC to a host, the method consisting in:
- transmitting a transfer order to the application through a Javacard API;
- formatting the data in a pack, wherein the formatting is realized by the application;
- exporting the pack to the host.

6 Claims, 1 Drawing Sheet

(51) Int. Cl.
| | |
|---|---|
| *H04W 12/10* | (2009.01) |
| *G06F 9/445* | (2006.01) |
| *H04W 4/00* | (2009.01) |
| *H04W 8/20* | (2009.01) |
| *H04W 12/04* | (2009.01) |
| *H04L 29/06* | (2006.01) |
| *H04W 12/06* | (2009.01) |
| *H04L 29/08* | (2006.01) |
| *H04L 9/08* | (2006.01) |
| *H04W 8/22* | (2009.01) |
| *H04B 1/3816* | (2015.01) |
| *H04W 12/08* | (2009.01) |
| *H04W 8/18* | (2009.01) |
| *H04W 84/04* | (2009.01) |

(52) U.S. Cl.
CPC ........ *H04L 9/0825* (2013.01); *H04L 63/0428* (2013.01); *H04L 63/08* (2013.01); *H04L 63/083* (2013.01); *H04L 63/123* (2013.01); *H04L 67/34* (2013.01); *H04W 4/001* (2013.01); *H04W 4/003* (2013.01); *H04W 4/005* (2013.01); *H04W 8/183* (2013.01); *H04W 8/205* (2013.01); *H04W 8/22* (2013.01); *H04W 8/245* (2013.01); *H04W 12/04* (2013.01); *H04W 12/06* (2013.01); *H04W 12/08* (2013.01); *H04W 12/10* (2013.01); *H04W 8/18* (2013.01); *H04W 84/04* (2013.01)

(58) Field of Classification Search
CPC ............ G06Q 20/3574; G06Q 20/341; G06Q 20/367; G06Q 20/3552; G06Q 20/02; G06Q 20/105; H04W 8/205; H04W 12/04
See application file for complete search history.

(56) References Cited

U.S. PATENT DOCUMENTS

| | | | |
|---|---|---|---|
| 7,146,161 B2 | 12/2006 | Chou | |
| 7,349,719 B2 | 3/2008 | Buniatyan | |
| 7,363,056 B2 | 4/2008 | Faisy | |
| 8,655,966 B1 * | 2/2014 | Raj .................... | G06F 11/1464 707/621 |
| 9,092,775 B2 | 7/2015 | Bernard et al. | |
| 2002/0186845 A1 | 12/2002 | Dutta et al. | |
| 2003/0212896 A1 * | 11/2003 | Kisliakov ............ | G06F 1/1626 713/193 |
| 2004/0131186 A1 | 7/2004 | Kasuya et al. | |
| 2004/0235523 A1 | 11/2004 | Schrire et al. | |
| 2005/0021875 A1 | 1/2005 | Bouthemy et al. | |
| 2005/0164737 A1 | 7/2005 | Brown | |
| 2005/0186954 A1 | 8/2005 | Kenney | |
| 2005/0239504 A1 | 10/2005 | Ishii et al. | |
| 2005/0266883 A1 | 12/2005 | Chatrath | |
| 2005/0279826 A1 | 12/2005 | Merrien | |
| 2006/0049243 A1 | 3/2006 | Sakamura et al. | |
| 2006/0079284 A1 | 4/2006 | Lu et al. | |
| 2006/0086785 A1 | 4/2006 | Sakata | |
| 2006/0196931 A1 | 9/2006 | Holtmanns et al. | |
| 2006/0199614 A1 | 9/2006 | Hyacinthe | |
| 2006/0285663 A1 * | 12/2006 | Rathus ............ | H04M 1/274516 379/88.22 |
| 2007/0105532 A1 | 5/2007 | Martin et al. | |
| 2007/0239857 A1 | 10/2007 | Mahalal et al. | |
| 2008/0090014 A1 | 4/2008 | Sicher et al. | |
| 2008/0130879 A1 | 6/2008 | Heinonen et al. | |
| 2008/0261561 A1 * | 10/2008 | Gehrmann ............ | H04W 8/205 455/411 |
| 2008/0292074 A1 | 11/2008 | Boni et al. | |
| 2008/0319823 A1 | 12/2008 | Ahn et al. | |
| 2009/0159692 A1 | 6/2009 | Chew et al. | |
| 2009/0163175 A1 | 6/2009 | Shi et al. | |
| 2009/0191857 A1 | 7/2009 | Horn et al. | |
| 2009/0191917 A1 | 7/2009 | Zappulla et al. | |
| 2009/0191918 A1 | 7/2009 | Mardiks | |
| 2009/0215431 A1 | 8/2009 | Koraichi | |
| 2009/0217348 A1 | 8/2009 | Salmela et al. | |
| 2009/0307142 A1 | 12/2009 | Mardikar | |
| 2010/0179907 A1 | 7/2010 | Atkinson | |
| 2011/0028126 A1 | 2/2011 | Lim et al. | |
| 2011/0035584 A1 | 2/2011 | Meyerstein et al. | |
| 2011/0059773 A1 | 3/2011 | Neumann et al. | |
| 2011/0081950 A1 | 4/2011 | Guven | |
| 2011/0126183 A1 | 5/2011 | Bernard et al. | |
| 2011/0136482 A1 | 6/2011 | Kaliner | |
| 2011/0237190 A1 | 9/2011 | Jolivet | |
| 2011/0302641 A1 | 12/2011 | Hald et al. | |
| 2011/0320600 A1 | 12/2011 | Froeding et al. | |
| 2012/0028609 A1 | 2/2012 | Hruska | |
| 2012/0108295 A1 | 5/2012 | Schell et al. | |
| 2012/0113865 A1 | 5/2012 | Zhao et al. | |
| 2012/0190354 A1 | 7/2012 | Merrien et al. | |
| 2012/0297473 A1 | 11/2012 | Case et al. | |
| 2013/0318355 A1 | 11/2013 | Girard et al. | |
| 2013/0324091 A1 | 12/2013 | Girard et al. | |
| 2013/0329683 A1 | 12/2013 | Berard et al. | |
| 2014/0019760 A1 | 1/2014 | Vergnes et al. | |
| 2014/0024343 A1 | 1/2014 | Bradley | |
| 2014/0031083 A1 | 1/2014 | Vergnes et al. | |
| 2014/0057680 A1 | 2/2014 | Proust et al. | |
| 2014/0066011 A1 | 3/2014 | Bradley | |
| 2014/0122872 A1 | 5/2014 | Merrien et al. | |
| 2014/0141747 A1 | 5/2014 | Merrien et al. | |

FOREIGN PATENT DOCUMENTS

| | | | |
|---|---|---|---|
| CN | 101309518 A | 11/2008 | |
| DE | 10 2008 033 976 A1 | 1/2010 | |
| EP | 1 650 717 A1 | 4/2006 | |
| EP | 1 965 596 A1 | 9/2008 | |
| EP | 2 056 523 A1 | 5/2009 | |
| EP | 2 076 071 A1 | 7/2009 | |
| FI | WO 2009103623 A2 * | 8/2009 | ............. H04L 63/08 |
| FR | 2 871 020 A1 | 12/2005 | |
| GB | 2 457 221 A | 8/2009 | |
| JP | 2002-236572 A | 8/2002 | |
| JP | 2005-323128 A | 11/2005 | |
| JP | 2006-050554 A | 2/2006 | |
| JP | 2006-107316 A | 4/2006 | |
| JP | 2007-019897 A | 1/2007 | |
| JP | 2007-513534 A | 5/2007 | |
| JP | 2007-201883 A | 8/2007 | |
| JP | 2007-235492 A | 9/2007 | |
| JP | 2008-131469 A | 6/2008 | |
| JP | 2008-519343 A | 6/2008 | |
| JP | 2009-037602 A | 2/2009 | |
| JP | 2009-038598 A | 2/2009 | |
| JP | 2010-501092 A | 1/2010 | |
| JP | 2010-532107 A | 9/2010 | |
| JP | 2011-525311 A | 9/2011 | |
| JP | 2012-528534 A | 11/2012 | |
| KR | 2002-0066032 A | 8/2002 | |
| KR | 2003-0044260 A | 6/2003 | |
| KR | 10-0489783 B1 | 5/2005 | |
| KR | 10-2005-0095424 A | 9/2005 | |
| KR | 2007-0095048 A | 9/2007 | |
| KR | 10-2008-0014285 A | 2/2008 | |
| KR | 10-2008-0015870 A | 2/2008 | |
| KR | 10-2009-0056019 A | 6/2009 | |
| KR | 10-2010-0095648 A | 8/2010 | |
| KR | 10-2010-011642 A | 10/2010 | |
| WO | 02/082715 A1 | 10/2002 | |
| WO | 03/104997 A1 | 12/2003 | |
| WO | 2004/021296 A1 | 3/2004 | |
| WO | 2004/105421 A2 | 12/2004 | |
| WO | 2007/058241 A1 | 5/2007 | |
| WO | 2008/128874 A1 | 10/2008 | |
| WO | WO 2008/123827 | 10/2008 | |
| WO | 2009/055910 A1 | 5/2009 | |
| WO | 2009/092115 A2 | 7/2009 | |

(56) References Cited

FOREIGN PATENT DOCUMENTS

| WO | 2009091837 A1 | 7/2009 |
|---|---|---|
| WO | 2009/095295 A1 | 8/2009 |
| WO | 2009/103623 A2 | 8/2009 |
| WO | 2009/141024 A1 | 11/2009 |
| WO | 2009/141035 A1 | 11/2009 |
| WO | 2009/149788 A2 | 12/2009 |
| WO | 2010/052332 A1 | 5/2010 |
| WO | 2010068016 A3 | 6/2010 |
| WO | 2010/138592 A2 | 12/2010 |
| WO | 2011139795 A1 | 11/2011 |
| WO | 2011159549 A1 | 12/2011 |
| WO | 2012012526 A1 | 1/2012 |
| WO | 2012058092 A1 | 5/2012 |
| WO | 2012058099 A1 | 5/2012 |
| WO | 2012058429 A2 | 5/2012 |
| WO | 2012058446 A1 | 5/2012 |
| WO | 2012058450 A1 | 5/2012 |
| WO | 2012061516 A1 | 5/2012 |
| WO | 2012061561 A2 | 5/2012 |
| WO | 2012065112 A2 | 5/2012 |

OTHER PUBLICATIONS

An English Translation of the Office Action (Notice of Reasons for Rejection) issued on Apr. 15, 2014, by the Japan Patent Office in the Japanese Patent Application No. 2013-542477. (3 pages).
"3rd Generation Partnership Project; Technical Specification Group Services and System Aspects; 3G Security; Specification of the MILENAGE Algorithm Set; An example algorithm set for the 3GPP authentication and key generation functions f1, f1*, f2, f3, f4, f5 and f5*; Document 2: Algorithm Specification (Release 11)", 3GPP TS 35.206 V11.0.0 (Sep. 2012), pp. 1-31.
International Search Report (Form PCT/ISA/210) and the Written Opinion of the International Searching Authority (Form PCT/ISA/237) issued on Feb. 22, 2012, by the European Patent Office in the International Application No. PCT/EP2011/071674. (8 pages).
"3rd Generation Partnership Project; Technical Specification Group Services and System Aspects; Feasibility Study on Remote Management of USIM Application on M2M Equipment; (Release 8)", 3GPP TR 33.812 V1.0.0 (Sep. 2008), pp. 1-80.
International Search Report (Form PCT/ISA/210) and the Written Opinion of the International Searching Authority (Form PCT/ISA/237) issued on Feb. 27, 2012, by the European Patent Office in the International Application No. PCT/EP2011/071660. (6 pages).
An English Translation of the Office Action (Notice of Reasons for Rejection) issued on Jun. 17, 2014, by the Japan Patent Office in the Japanese Patent Application No. 2013-542492. (3 pages).
International Search Report (Form PCT/ISA/210) and the Written Opinion of the International Searching Authority (Form PCT/ISA/237) issued on Apr. 16, 2012, by the European Patent Office in the International Application No. PCT/EP2011/071919. (7 pages).
An English Translation of the Office Action (Notice of Reasons for Rejection) issued on Apr. 30, 2014, by the Japan Patent Office in the Japanese Patent Application No. 2013-542496. (2 pages).
International Search Report (Form PCT/ISA/210) and the Written Opinion of the International Searching Authority (Form PCT/ISA/237) issued on Feb. 15, 2012, by the European Patent Office in the International Application No. PCT/EP2011/071778. (9 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071781. (11 pages).
International Search Report (Form PCT/ISA/210) and the Written Opinion of the International Searching Authority (Form PCT/ISA/237) issued on Mar. 28, 2012, by the European Patent Office in the International Application No. PCT/EP2011/071737. (6 pages).
International Search Report (Form PCT/ISA/210) and the Written Opinion of the International Searching Authority (Form PCT/ISA/237) issued on Apr. 4, 2012, by the European Patent Office in the International Application No. PCT/EP2011/071731. (12 pages).
Partial European Search Report issued on Jul. 22, 2011, by the European Patent Office in the European Application No. 10 30 6359. (7 pages).
International Search Report (Form PCT/ISA/210) and the Written Opinion of the International Searching Authority (Form PCT/ISA/237) issued on Apr. 5, 2012, by the European Patent Office in the International Application No. PCT/EP2011/071785. (9 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071664. (8 pages).
Written Opinion of the International Preliminary Examining Authority (Form PCT/IPEA/408) issued on Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) issued on Mar. 8, 2013, by the European Patent Office in the International Application No. PCT/EP2011/071664. (14 pages).
Office Action issued by the U.S. Patent and Trademark Office in the U.S. Appl. No. 13/312,309, mailed Sep. 25, 2013, U.S. Patent and Trademark Office, Alexandria, VA. (13 pages).
Office Action issued by the U.S. Patent and Trademark Office in the U.S. Appl. No. 13/312,309, mailed Apr. 24, 2014, U.S. Patent and Trademark Office, Alexandria, VA. (13 pages).
IP Based Over-the Air Handset Configuration Management (IOTA-HCM), 3rd Generation Partnership Project 2 "3GPP2", 3GPP2 C.S0040, Version 1.0, Jul. 18, 2003, pp. 1-68.
"Smart Cards; Card Application Toolkit (CAT) (Release 9)", ETSI TS 102 223, vol. SCP TEC, No. V9.2.0, (Oct. 1, 2010), pp. 1-209.
International Search Report (Form PCT/ISA/210) and the Written Opinion of the International Searching Authority (Form PCT/ISA/237) issued on Feb. 22, 2012, by the European Patent Office in the International Application No. PCT/EP2011/071675. (12 pages).
Madlmayr et al., "The Benefit of using SIM Application Toolkit in the Context of Near Field Communication Applications" International Conference on the Management of Mobile Business, (Jul. 2007), (8 pages).
Office Action issued by the U.S. Patent and Trademark Office in the U.S. Appl. No. 13/991,823, mailed Jan. 5, 2015, U.S. Patent and Trademark Office, Alexandria, VA. (25 pages).
Office Action issued by the U.S. Patent and Trademark Office in the U.S. Appl. No. 13/991,846, mailed Feb. 10, 2015, U.S. Patent and Trademark Office, Alexandria, VA. (26 pages).
Office Action issued by the U.S. Patent and Trademark Office in the U.S. Appl. No. 13/992,065, mailed Dec. 18, 2014, U.S. Patent and Trademark Office, Alexandria, VA. (26 pages).
Office Action issued by the U.S. Patent and Trademark Office in the U.S. Appl. No. 13/991,744, mailed Dec. 12, 2014, U.S. Patent and Trademark Office, Alexandria, VA. (33 pages).
Notice of Allowance issued by the U.S. Patent and Trademark Office in the U.S. Appl. No. 13/991,752, mailed Jan. 21, 2015, U.S. Patent and Trademark Office, Alexandria, VA. (30 pages).
Office Action issued by the U.S. Patent and Trademark Office in the U.S. Appl. No. 13/991,766, mailed Mar. 17, 2015, U.S. Patent and Trademark Office, Alexandria, VA. (33 pages).
Office Action issued by the U.S. Patent and Trademark Office in the U.S. Appl. No. 13/992,039, mailed Mar. 17, 2015, U.S. Patent and Trademark Office, Alexandria, VA. (35 pages).
Office Action (Notice of Preliminary Rejection) issued on Feb. 25, 2015, by the Korean Patent Office in Korean Patent Application No. 10-2013-0717638, and an English Translation of the Office Action. (7 pages).
International Search Report (PCT/ISA/210) issued on Apr. 12, 2012, by the European Patent Office as the International Searching Authority for International Application No. PCT/EP2011/071695.
Written Opinion (PCT/ISA/237) issued on Apr. 12, 2012, by the European Patent Office as the International Searching Authority for International Application No. PCT/EP2011/071695, and comments filed by the Applicant on May 31, 2012.
English translation of Office Action issued by the Korean Patent Office on Aug. 28, 2014 in corresponding Korean Application No. 10-2013-7016004. (3 pages).

(56) References Cited

OTHER PUBLICATIONS

English translation of Office Action issued by the Korean Patent Office on Apr. 16, 2015 in corresponding Korean Application No. 10-2013-7016004. (2 pages).
Office Action issued by the Russian Patent Office dated Dec. 29, 2014 in corresponding Russian Application No. 2013131034, and English translation of Office Action. (6 pages).
Office Action (Notice of Reasons for Rejection) issued on Aug. 19, 2014, by the Japan Patent Office in Japanese Patent Application No. 2013-542497, and an English Translation of the Office Action. (9 pages).
Office Action (Notice of Preliminary Rejection) issued on Jun. 27, 2014, by the Korean Intellectual Property Office, in Korean Patent Application No. 10-2013-7017637, and an English Translation of the Office Action. (7 pages).
Office Action (Notice of Preliminary Rejection) issued on Aug. 19, 2014, by the Korean Intellectual Property Office in corresponding Korean Patent Application No. 10-2013-7016486, and an English Translation of the Office Action. (6 pages).
Office Action (Notice of Reasons for Rejection) issued on Aug. 5, 2014, by the Japan Patent Office in Japanese Patent Application No. 2013-542474, and an English Translation of the Office Action. (4 pages).
Office Action issued by the U.S. Patent and Trademark Office in the U.S. Appl. No. 13/991,766, mailed Oct. 1, 2015, U.S. Patent and Trademark Office, Alexandria, VA. (27 pages).
Office Action issued by the U.S. Patent and Trademark Office in the U.S. Appl. No. 13/992,039, mailed Oct. 1, 2015, U.S. Patent and Trademark Office, Alexandria, VA. (28 pages).
Office Action issued by the U.S. Patent and Trademark Office in the U.S. Appl. No. 13/991,846, mailed Oct. 15, 2015, U.S. Patent and Trademark Office, Alexandria, VA. (23 pages).
Office Action issued by the U.S. Patent and Trademark Office in the U.S. Appl. No. 14/603,889, mailed Oct. 23, 2015, U.S. Patent and Trademark Office, Alexandria, VA. (36 pages).
Office Action issued by the Chinese Patent Office on Aug. 27, 2015 in corresponding Chinese Application No. 201180058683.0, and English language translation of Office Action (17 pages).
Office Action issued by the U.S. Patent and Trademark Office in the U.S. Appl. No. 13/991,744, mailed Jun. 2, 2015, U.S. Patent and Trademark Office, Alexandria, VA. (35 pages).
Office Action issued by the U.S. Patent and Trademark Office in the U.S. Appl. No. 13/991,689, mailed Jun. 18, 2015, U.S. Patent and Trademark Office, Alexandria, VA. (46 pages).
Office Action issued by the U.S. Patent and Trademark Office in the U.S. Appl. No. 13/991,823, mailed Jul. 13, 2015, U.S. Patent and Trademark Office, Alexandria, VA. (21 pages).
Office Action issued by the U.S. Patent and Trademark Office in the U.S. Appl. No. 13/991,912, mailed Jul. 23, 2015, U.S. Patent and Trademark Office, Alexandria, VA. (45 pages).
Office Action issued by the U.S. Patent and Trademark Office in the U.S. Appl. No. 13/992,065, mailed Jul. 30, 2015, U.S. Patent and Trademark Office, Alexandria, VA. (32 pages).
Office Action issued by the Chinese Patent Office on Aug. 19, 2015 in corresponding Chinese Application No. 201180058922.2, and English language translation of Office Action (16 pages).
Office Action issued by the Chinese Patent Office on Nov. 4, 2015 in corresponding Chinese Application No. 201180058688.3 (5 pages).
Office Action issued Nov. 17, 2015 by the Chinese Patent Office in corresponding Chinese Patent Application No. 201180058925.6 (10 pages).
3GPP TS 22.101 V11.0.0 (Sep. 2010), Sep. 2010.
European Office Action dated Dec. 23, 2015 issued in corresponding European Patent Appln. No. 11 810 809.1 (5 pages).
European Office Action dated Jan. 19, 2016 issued in corresponding European Patent Appln. No. 11 811 335.6 (6 pages).
Japanese Office Action dated Jan. 5, 2016 issued in corresponding Japanese Patent Appln. No. 2015-082449, with English translation (5 pages).
Japanese Office Action dated Jan. 19, 2016 issued in corresponding Japanese Patent Appln. No. 2013-054275 with English translation (14 pages).
U.S. Office Action dated Feb. 1, 2016 issued in corresponding U.S. Appl. No. 13/991,823 (15 pages).
U.S. Office Action dated Feb. 2, 2016 issued in corresponding U.S. Appl. No. 13/991,912 (30 pages).
U.S. Office Action dated Feb. 2, 2016 issued in corresponding U.S. Appl. No. 13/992,039 (24 pages).
U.S. Office Action dated Feb. 10, 2016 issued in corresponding U.S. Appl. No. 13/992,065 (23 pages).
Office Action issued by the U.S. Patent and Trademark Office in the U.S. Appl. No. 13/991,846, mailed Apr. 5, 2016, U.S. Patent and Trademark Office, Alexandria, VA. (24 pages).
Offce Action (Notice of Reasons for Rejection) issued on Feb. 2, 2016, by the Japanese Patent Office in Japanese Patent Application No. 2015-018547, and an English Translation of the Office Action. (5 pages).
Office Action issued on Jan. 19, 2016, by the European Patent Office in European Patent Application No. 11 811 335.6 (4 pages).
3rd Generation Partnership Project; Technical Specification Group Services and System Aspects; Feasibility study on the security aspects of remote provisioning and change of subscription for Machine to Machine (M2M) equipment (Release 9); 3GPP Draft; 33812-920, published by the 3rd Generation Partnership Project (3GPP) in Sophia-Antipolis Cedex, France on Jun. 22, 2010 (87 pages).

* cited by examiner

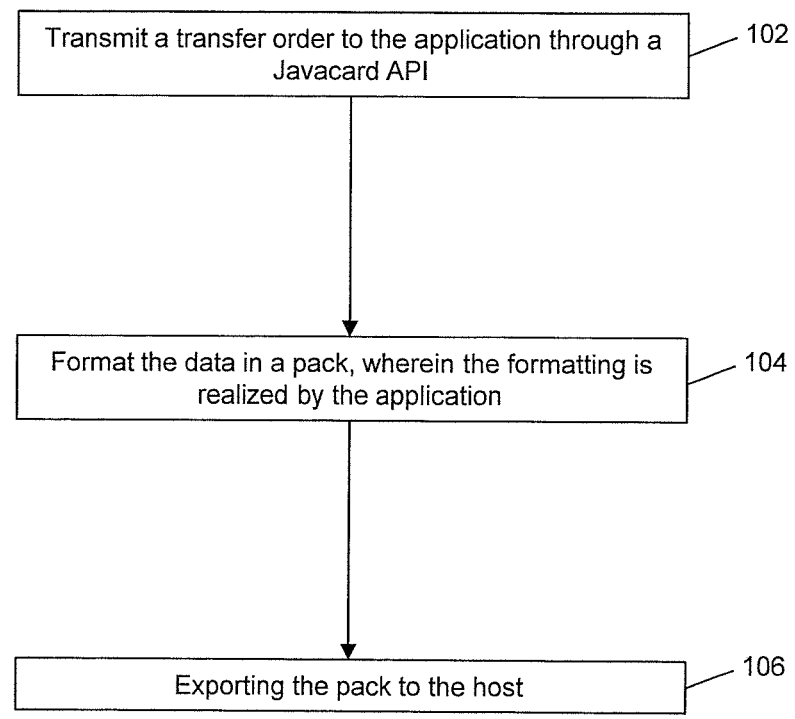

METHOD FOR EXPORTING DATA OF A JAVACARD APPLICATION STORED IN A UICC TO A HOST

This disclosure is a national phase of PCT/EP2011/071695, a continuation of U.S. application Ser. No. 13/312,309, filed Dec. 6, 2011, and claims priority of European Application No. 10306359.0, filed Dec. 6, 2010, the disclosures of which are hereby incorporated by reference.

FIELD

Background

The present inventions concerns a method for exporting data of a Javacard application stored in a UICC (Universal Integrated Circuit Card) to a host.

A UICC is a secure element used in the telecommunication domain. A UICC embeds Sim applications and is installed, fixedly or not, in terminals, like for example mobile phones. In some cases, the terminals are constituted by machines that communicate with other machines for M2M (Machine to Machine) applications.

A UICC can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card. Soon the race for smaller telephones called for a smaller version of the card.

Since the card slot is standardized, a subscriber can easily move their wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the motherboard of the terminal or machine and constitutes an e-UICC.

SUMMARY

A parallel to such soldered UICCs or to such chips containing the same applications than the chips comprised in UICCs can be done for UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened.

DESCRIPTION OF DRAWING FIGURES

FIG. 1 is a flow chart illustrating a process for exporting data of a Javacard application in accordance with exemplary embodiments.

DETAILED DESCRIPTION

In the next description, welded UICCs or chips containing or designed to contain the same applications than UICCs will generally be called embedded UICCs or embedded secure elements (in contrast to removable UICCs or removable secure elements). This will also apply to UICCs or secure elements that are removable with difficulty.

The present invention concerns a way to notify an application executed on a UICC that it is going to be removed and exported out of the UICC, for example to be installed in another UICC, whether directly or through a host (server).

The invention takes place in an environment where subscriptions and related applications can be downloaded on UICC cards with a remote provisioning system.

On these UICC cards, different application could be installed and managed by the current MNO or by a third party (e.g. Transport or Banking application).

There is a need to move all data from a UICC card to another UICC card, and in particular the data of MNO and third party applications.

This can be done through proprietary solutions.

This invention concerns a method applicable to Javacard applications to be exported with the corresponding data from a UICC (removable or embedded) to a host, this host being for example another UICC.

The invention proposes a method 100, illustrated in FIG. 1, for exporting data of a Javacard application stored in a UICC to a host, the method consisting in:

transmitting a transfer order to the application through a Javacard API (step 102);

formatting the data in a pack, wherein the formatting is realized by the application (step 104);

exporting the pack to the host (step 106).

The host can be a remote server to which the pack is exported for being downloaded later, for example on another UICC.

The host can also be another UICC. In this case, the pack is directly transferred from a first UICC to a second UICC without intermediate.

The export can be managed by the host (the host retrieves the pack of data) or by the UICC (the UICC sends the pack of data).

The invention also proposes a method for importing a pack of data of a Javacard application stored in a host to a UICC, the method consisting in:

transmitting a import order of the data to an application through a Javacard API, the application being located on the UICC;

unpacking the data, wherein the unpacking is realized by the application.

An application programming interface (API) is an interface implemented by a software program that enables it to interact with other software. It facilitates interaction between different software programs similar to the way the user interface facilitates interaction between humans and computers.

The invention proposes to define a new Export/Import Javacard API that can be used by any applications based on the Javacard standards APIs. This new Export/Import Javacard API comprises at least one entry point to inform an application it should export its data and one entry point to inform an application that data have to be imported and which data. These entry points are invoked by the Operating System of the UICC if they are implemented by an application. An application implementing this new API can be deployed on any Javacard compliant UICC providing this API (independently of the card manufacturer), ensuring an easy interoperability. The entry point for export corresponds to a function of exporting the data of an application stored in a UICC, this UICC being for example embedded (not removable) in a terminal, for example a mobile terminal or a machine. The mobile terminal is for example a mobile phone. It is then possible to transfer data of an application from a first UICC to a second UICC, the second UICC comprising the same application than the first one. The second UICC will then be able to work with this application in the same environment than the first one, i.e. with the same data. The first and second UICC do not need to be of same UICC manufacturer.

When triggered by this event, the application takes necessary action to back up, inform or what it need with a remote server to keep the portability of the confidential user data associated to the application. (e.g. back up electronic purse credit).

When the data shall be moved from one UICC card to another, all applications on UICC implementing this API are preferably notified that it is going to be deleted from this UICC card and exported (for example on another one).

The method for exporting data of a Javacard application stored in a UICC to a host consists firstly in transmitting a transfer order to this application through a Javacard API. The transmission of this order can be done by the OS of the UICC, for example after a user's action in a menu of the GUI of the terminal.

The application itself then formats a pack of the data linked to this application. The pack is then ready to be exported to a host, for example to a remote server via an IP or link. The pack can also be directly transferred to another UICC, for example via NFC or Bluetooth.

The host can take the initiative to retrieve the pack from the UICC or the UICC can itself decide to export the pack of data.

The data pack is preferably transmitted in a ciphered manner to the host.

Once installed in the host, the exported pack can be retrieved to be installed on another UICC. In this respect, the invention proposes to transmit an import order of the data to the same application through an Export/Import Javacard API, the application being located on the UICC, and to unpack the data (the unpacking being realized by the application).

Since the application that has realized the formatting of the data pack in the first UICC is the same than the application in the second UICC that unpacks the data pack, the same environment is obtained at the level of the second UICC.

Once exported, the data and the application on the first UICC are deleted in order to avoid a duplication of the application and the data.

Thanks to the invention, as notified, an application or all the applications embedded in a UICC will be able to backup user confidential and portable data to a remote server.

The application takes care itself of which data shall be exported and how they are secured.

The invention is preferably applied to embedded UICCs, for example in order to transfer data of an application (e.g. a banking application) from a first UICC comprised in a first terminal to a second UICC comprised in a second terminal. The banking application is already installed in the second UICC when the transfer of data to this second UICC occurs or can be installed afterwards.

The invention claimed is:

1. A computer-implemented method for exporting data of a Javacard application stored in a universal integrated circuit card (UICC) to a host, said computer-implemented method comprising:

transmitting a transfer order to said Javacard application through a Javacard application programming interface (API);

identifying, by said Javacard application, which data shall be exported formatting said data in a pack, wherein said formatting is realized by said Javacard application and wherein said formatting is independent of a ciphering operation; and exporting said pack to said host, wherein said host includes a host application configured to unpack said data from said pack, said host application is the same as said Javacard application, and said data includes data belonging to the Javacard application.

2. The computer-implemented method according to claim 1, wherein said host is a remote server.

3. The computer-implemented method according to claim 1, wherein said host is another UICC.

4. The computer-implemented method according to claim 1, wherein said host downloads said pack from said UICC.

5. The computer-implemented method according to claim 1, wherein said Javacard application exports said pack to said host.

6. A computer-implemented method for importing a pack of data of a Javacard application stored in a host to a universal integrated circuit card (UICC), said computer-implemented method comprising:

transmitting an import order of said data to said Javacard application through a Javacard application programming interface (API), said Javacard application being located on said UICC; and unpacking said data, wherein said unpacking is realized by said Javacard application, wherein said unpacking is independent of a deciphering operation, and wherein said host includes a host application configured to identify said data for exporting and format said data into said pack, said host application is the same as said Javacard application, and said data includes data belonging to the Javacard application.

* * * * *